(12) United States Patent
Hrecznyj et al.

(10) Patent No.: US 12,447,794 B2
(45) Date of Patent: Oct. 21, 2025

(54) FLUID COUPLING OF A CLIMATE CONTROL SYSTEM FOR A VEHICLE

(71) Applicant: Ford Global Technologies, LLC, Dearborn, MI (US)

(72) Inventors: Michael Hrecznyj, Livonia, MI (US); Michael M. Azzouz, Farmington, MI (US); Scott Nydam, Farmington Hills, MI (US); Clay Wesley Maranville, Ypsilanti, MI (US); Chris Robert Sculthorpe, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 488 days.

(21) Appl. No.: 18/073,845

(22) Filed: Dec. 2, 2022

(65) Prior Publication Data
US 2024/0181838 A1     Jun. 6, 2024

(51) Int. Cl.
*B60H 1/00*     (2006.01)
(52) U.S. Cl.
CPC ..... *B60H 1/00514* (2013.01); *B60H 1/00271* (2013.01); *B60H 1/00564* (2013.01); *B60H 1/00871* (2013.01); *B60H 2001/00214* (2013.01)
(58) Field of Classification Search
CPC .................................................. B60H 1/00271
See application file for complete search history.

(56) References Cited

U.S. PATENT DOCUMENTS

| 3,850,006 | A | | 11/1974 | Redfern et al. |
| 4,637,222 | A | | 1/1987 | Fujiwara et al. |
| 4,765,151 | A | * | 8/1988 | Bessey ............... F25D 3/06 62/239 |
| 5,203,833 | A | * | 4/1993 | Howell ............. B60N 3/104 165/41 |
| 5,588,480 | A | * | 12/1996 | Armanno, Sr. .... B60H 1/00271 165/41 |
| 7,007,494 | B2 | * | 3/2006 | Al Rashidi ........... A47J 47/14 165/41 |
| 10,953,721 | B2 | | 3/2021 | Gruber |

(Continued)

FOREIGN PATENT DOCUMENTS

| CN | 102320257 A | 1/2012 |
| DE | 102012204160 A1 | 9/2013 |

(Continued)

OTHER PUBLICATIONS

Tesla Model S Front Trunk (Frunk) Electric Cooler Review, 9 pages, posted on Jan. 31, 2014, www.teslarati.com/tesla-model-s-front-trunk-frunk-cooler/.

*Primary Examiner* — Allen R. B. Schult
(74) *Attorney, Agent, or Firm* — Vichit Chea; Price Heneveld LLP (57) ABSTRACT

A fluid connection for a vehicle includes a container selectively coupled with a compartment of the vehicle. The container includes at least one passage in fluid communication with an interior of the container. At least one port is disposed on the compartment and in fluid communication with a climate control system in the vehicle. The at least one passage is in fluid communication with the at least one port when the container is coupled with the compartment. The at least one port has an elongated cross-sectional area at a connection interface between the at least one port and the at least one passage.

15 Claims, 3 Drawing Sheets

(56) References Cited

U.S. PATENT DOCUMENTS 11,148,602 B2 10/2021 Ahlning
2018/0037150 A1 2/2018 Rotharmel

FOREIGN PATENT DOCUMENTS

| DE | 102016203084 A1 | 9/2017 |
| DE | 102020135071 A1 | 7/2021 |
| WO | 2021245557 A1 | 12/2021 |

* cited by examiner

FLUID COUPLING OF A CLIMATE CONTROL SYSTEM FOR A VEHICLE

FIELD OF THE DISCLOSURE

The present disclosure generally relates to a fluid coupling of a climate control system for a vehicle and, more particularly, to guiding features for fluid flow between the vehicle and a container for the vehicle.

BACKGROUND OF THE DISCLOSURE

Compartments for vehicles can be climate controlled. For example, some compartments may be configured for heating or cooling items in the compartment. Alternatively, a climate controlled case may be disposed in a dedicated location in the vehicle. However, conventional climate controlled cases do not typically couple with onboard heating or cooling devices associated with the vehicle. Further, typical climate controlled cases may not effectively distribute fluid flow efficiently. A need is presented for an air guide system that enhances air guiding and limits blockage of air flow in the casing or the dedicated location in the vehicle.

SUMMARY OF THE DISCLOSURE

According to a first aspect of the present disclosure, a fluid connection for a vehicle includes a container selectively coupled with a compartment of the vehicle. The container includes at least one passage in fluid communication with an interior of the container. At least one port is disposed on the compartment in fluid communication with a climate control system in the vehicle. The at least one passage is in fluid communication with the at least one port when the container is coupled with the compartment. The at least one port has an elongated cross-sectional area at a connection interface between the at least one port and the at least one passage.

Embodiments of the first aspect of the present disclosure can include any one or a combination of the following features:
- the elongated cross-sectional area is elongated in a lateral direction generally parallel with a floor of the compartment;
- the at least one first port is disposed along an upper portion of the container;
- a first flow path and a second flow path each between the climate control system and the interior, wherein the at least one passage includes a first passage having a first vane configured to guide the first flow path away from the second flow path;
- the at least one passage includes a second passage having a second vane configured to guide the second flow path away from the first flow path;
- the at least one port includes a first port and a second port aligned with the first and second passages, respectively, and wherein the first flow path extends between the first passage and the first port and the second flow path extends between the second passage and the second port;
- the at least one port extends between an outer opening at the connection interface and an inner opening at the interior, wherein the opening is configured to guide fluid flow between the container and the at least one passage at an oblique angle relative to an inner wall of the container;
- an air guide disposed in the inner opening extending at an oblique angle relative to the inner wall and dividing the fluid flow into a plurality of fluid paths;
- the air guide includes a protruding portion extending from the opening into the interior;
- the air guide defines a clearance space between an end of the protruding portion and the opening;
- the clearance space is configured to provide fluid communication between the at least one port and the interior around an obstruction in the interior when the obstruction engages the air guide; and
- the inner wall includes a textured surface facing the interior to limit obstruction of the inner opening.

According to a second aspect of the present disclosure, a fluid connection of a climate control system for a vehicle includes a container selectively coupled with a compartment of the vehicle. The container includes a first port and a second port each extending through a sidewall of the container. A first passage and a second passage are disposed on the compartment each in fluid communication with the climate control system. An air guide is disposed in at least one of the first and second ports and is configured to guide fluid flow at an oblique angle relative to the sidewall of the container. The first and second ports are in fluid communication with the first and second ports at a connection interface when the container is coupled with the compartment.

Embodiments of the second aspect of the present disclosure can include any one or a combination of the following features:
- the ports and the passages each have an elongated cross-sectional area at the connection interface;
- each of the ports includes an opening facing the interior, and wherein the air guide includes a protruding portion that extends beyond the opening into the interior;
- the protruding portion defines a clearance region between the opening and an end of the protruding portion, wherein the protruding portion is configured to guide the fluid flow through the clearance region when an obstruction covers the opening; and
- a first portion of the fluid flow at the first port extends in a first direction, and wherein a second portion of the fluid flow at the second port extends in a second direction different than the first direction.

According to a third aspect of the present disclosure, a fluid connection for a vehicle includes a container selectively coupled with a compartment of the vehicle. The container includes a port extending through a sidewall of the container. A passage is disposed on the compartment and is in fluid communication with a climate control system in the vehicle. An air guide is disposed in the port and configured to guide fluid flow at an oblique angle relative to the sidewall of the container. The air guide includes a protruding portion extending into the interior and defining a clearance space between an end of the protruding portion and the sidewall.

Embodiments of the third aspect of the disclosure can include any one or a combination of the following features:
- the ports and the passages each have an elongated cross-sectional area at a connection interface between the port and the passage; and
- the passage includes a plurality of vanes at the connection interface configured to guide the fluid flow at an oblique angle relative to the connection interface.

These and other features, advantages, and objects of the present invention will be further understood and appreciated by those skilled in the art by reference to the following specification, claims, and appended drawings.

DETAILED DESCRIPTION OF PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
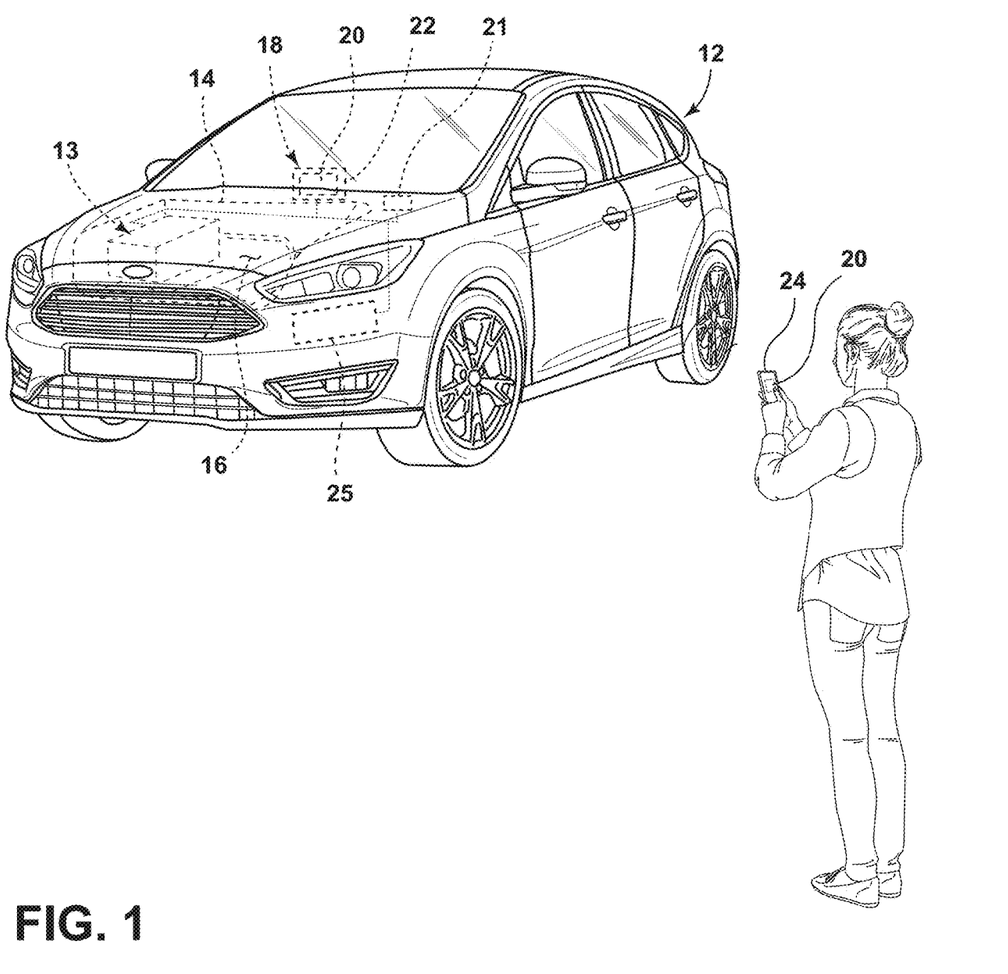
FIG. 1 is a perspective view of a vehicle housing a container that is climate controlled by a climate control system of the vehicle.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a fluid coupling of a climate control system for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In general, the present disclosure may provide for a climate-controlled thermal structure selectively disposed in an interior space of a vehicle. The interior space may be a preformed cavity within the vehicle that is capable of housing the thermal structure, such as a cooler, and securing the thermal structure to a structure that defines the interior space (e.g., an outer wall of the cavity). The thermal structure may be permanently or temporarily secured with the outer wall or otherwise within the interior space, such that the thermal structure may be removable from the interior space or configured to be kept in the interior space. In examples in which the thermal structure may be removed from the interior space (e.g., a portable cooler), an environment of the interior space may be climate-controlled. In this way, environmental conditions of the interior space as a whole and/or environmental conditions of an expandable or removable thermal structure may be controlled.

Referring generally to the figures, the present disclosure provides for a fluid connection 10 for use between a vehicle 12 and a thermal container 13. Although generally illustrated in the figures as being incorporated with a front trunk of the vehicle 12, it is contemplated that the fluid connection 10 of the present disclosure may be incorporated with any compartment 14 of the vehicle 12 and is not limited to the front trunk of the vehicle 12. For example, the compartment 14 may be a passenger compartment, trunk compartment, or any other area or exterior cavity disposed in the vehicle 12. In general, the compartment 14 may form a thermally insulated space 16, which may be climate controlled via a climate control system 18 having at least one interface 20 for controlling environmental attributes of the space 16. For example, the climate control system 18 may be configured to control a temperature, a humidity, an airspeed, or the like in or through the space 16 via a controller 21 of or in communication with the climate control system 18. For example, the controller 21 may be configured to adjust fluid communication between the climate control system 18 and the container 13. The at least one user interface 20 may be incorporated into a human-machine interface (HMI) 22 associated with a cabin of the vehicle 12 and/or may be incorporated into a mobile device 24, such as a phone, tablet, laptop, etc., for controlling the space 16 while inside or outside of the vehicle 12.

Although not shown in detail, the climate control system 18 may incorporate various heat control devices, such as a heat exchanger, that are configured to interface with the container 13 of the present disclosure. In some examples, the climate control system 18 includes a heat control source 25 disposed in the vehicle 12 that is configured to control hot or cold air to be delivered to the compartment 14 or the thermally-insulated structure (e.g., the thermal container 13). For example, the climate control system 18 may include multiple heat exchangers and/or multiple sub climate control systems that allow isolated or combined control for one or more compartments 14 of the vehicle 12. In general, the climate control system 18 may be configured to provide cool or warm air toward the compartment 14. For example, the climate control system 18 may supply cool air and return warm air in order to reduce the temperature of the compartment 14 or devices in the compartment 14. As will be further described herein, a cooler or other structure may cover inlets and/or outlets of the climate control system 18 in the compartment 14 in order to heat or cool the cooler or other thermal structure.

In some examples, the climate control system 18 includes a dedicated heat pump system or another subsystem such as a heating, ventilation, and air conditioning (HVAC) system of the vehicle 12. In one example, the climate control system 18 is a dedicated dual-box heat pump system (e.g., a compact vehicle thermal management system (CVTMS)). Other exemplary thermal management systems may be employed to provide cool air to a cooler, a thermal box, or another structure in order to allow the thermal structure to utilize the climate control system 18 of the vehicle 12 to manage/control thermal properties inside of the cooler.

Figure 2:
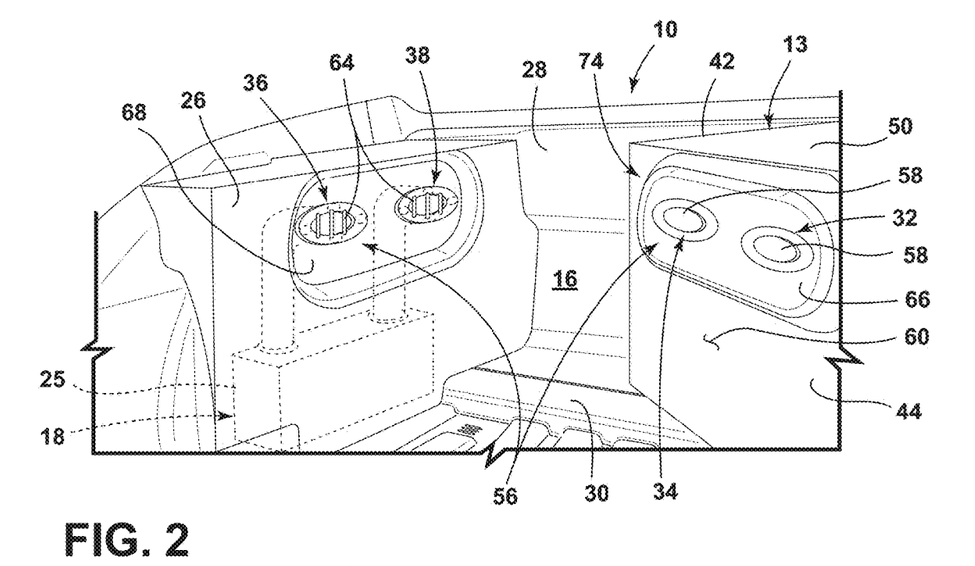
FIG. 2 is a perspective view of a fluid connection for a vehicle in a disconnected state according to one aspect of the present disclosure.
Figure 3:
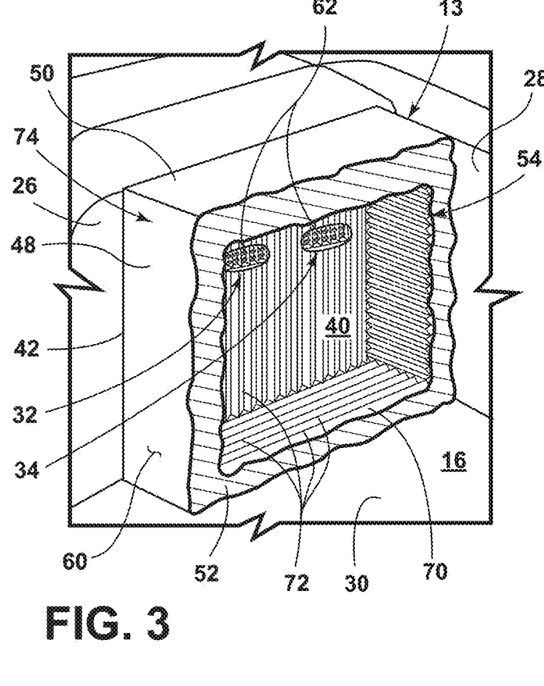
FIG. 3 is a perspective cutaway view of a container that is coupled with a compartment of the vehicle of FIG. 2.
Figure 4:
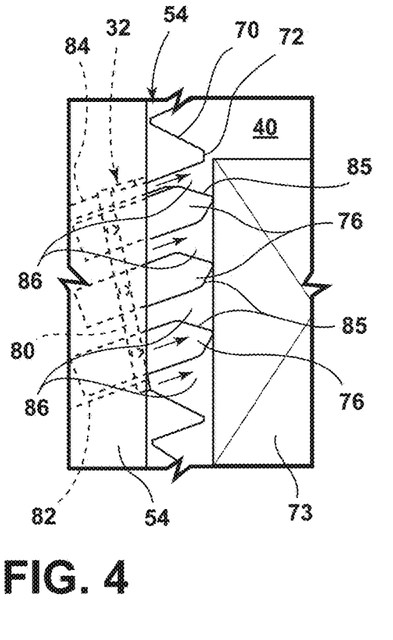
FIG. 4 is a partial cross-sectional view of an interior of the container taken at an inner opening of a fluid connection between an interior of the container and a port of the container.

Referring now to FIGS. 2-4, the compartment 14 may include a wall 26, 28, such as a lateral wall 26 or a back wall 28 that each extend upwardly from a floor 30 of the compartment 14. The fluid connection 10 of the present disclosure includes at least one port 32, 34 disposed on the container 13 and at least one passage 36, 38 disposed on the wall 26, 28. When aligned and coupled with one another, the at least one port 32, 34 and the at least one passage 36, 38 provide fluid communication between an interior 40 of the container 13 and the climate control system 18 of the vehicle 12. The container 13 may be a cooler or another thermally managed device that is operable to limit heat transfer through a body of the container 13. For example, a sidewall 42 of the container 13, which may include a rear wall 44, lateral walls 48, and top or bottom walls 50, 52 may define the interior 40 and further include an inner wall 54 that is adjacent to the interior 40 of the container 13. In general, the fluid connection 10 of the present disclosure may include a connection interface 56 that includes the area, or region, where the at least one port 32, 34 and the at least one passage 36, 38 meet. The first and second ports 32, 34 may each include an outer opening 58 disposed about an exterior surface 60 of the container 13 and an inner opening 62 (FIG. 3) exposed to the interior 40 of the container 13. The inner opening 62 faces the interior. Thus, the inner and outer openings 62, 58 serve as entries and exits for the ports 32, 34. Accordingly, the first and second ports 32, 34 may extend through the sidewall 42 between the inner and outer openings 58, 62.

At the connection interface 56, the shape and/or the directional/guiding features 64, 76 of the fluid connection 10 may allow for enhanced fluid flow between the interior 40 and the climate control system 18 (e.g., the heat control device) and enhanced thermal properties. For example, as will be described further herein, the shape of the connection interface 56 may allow for optimized positioning of the fluid connection 10, and the fluid guiding features 64, 76 may allow for enhanced thermal management within the container 13. As will be described further herein, the at least one passage 36, 38 may include a plurality of vent features that are configured to guide flow paths between the climate control system 18 and the interior 40 or the space 16 with particular directions. For example, as will be described further, the passages 36, 38 may include a plurality of vanes 64 that direct fluid flows at an oblique angle relative to the wall 26, 28 the compartment 14. As will also be described further in FIG. 4, the guiding features 64, 76 may also include a plurality of air guides 76 that may operate similarly to or differently from the plurality of vanes 64. In general, deflection of the fluid flow to be at an oblique angle relative to inlet or outlet surfaces will further be described with respect to the at least one first port 32 in relation to FIG. 4.

Referring more particularly to FIG. 2, the at least one port 32, 34 includes a first port 32 and a second port 34, and the at least one passage 36, 38 includes a first passage 36 and the second passage 38. When the container 13 is coupled with the compartment 14, the first port 32 is aligned with and adjacent to the first passage 36 and the second port 34 is aligned with and adjacent to the second passage 38. Although not described in detail herein, retention features at the connection interface 56 may provide a seal between the first and second 32, 34 ports and the first and second passages 36, 38 when the container 13 is coupled with the compartment 14 to limit fluid leakage into the compartment 14. An alignment feature 66 is disposed between the container 13 in the compartment 14 that includes protrusion 66 formed on the wall 26, 28 of the compartment 14 and an indentation 68 formed on the sidewall 42 of the container 13. The protrusion 66 may engage the indentation 68 to generally align the first and second ports 32, 34 with the first and second passages 36, 38. It is contemplated that other alignment or securing features may be employed to align and secure the fluid connection 10 at the connection interface 56.

Referring now more particularly to FIG. 3, the inner wall 54 of the container 13 may include a textured surface 70, such as a pleated surface including an array of ridges 72 that extend from the sidewall 42. The textured surface 70 may face the interior 40 and employ any number of rigid, semirigid, or deformable/non-deformable materials that may distribute a force of engagement of contents 73 (FIGS. 4 and 6) of the container 13 with the inner wall 54 of the container 13 that may result from movement of the contents 73 during transport of the container 13 or the vehicle 12. Although illustrated as having a pleated pattern, it is contemplated that the textured surface 70 may include any number of patterns having protruding parts and recess parts. It is also contemplated that fabrics, polymers, rubber materials, or the like may be employed in the textured surface 70 to soften engagement with the body of the container 13 by the objects 73 in the container 13.

It is contemplated that the first and second ports 32, 34 and first and second passages 36, 38 may serve as inlets or outlets for fluid flow paths between the interior 40 and the climate control system 18. In some examples, both the first and second ports 32, 34 and first and second passages 36, 38 serve as inlets to the interior 40. For example, in a heating operation where the container 13 is configured to maintain a high temperature, heat, in the form of hot air, may be provided from the heat control device to the interior 40 via pumping hot air through the passages 36, 38 and ports 32, 34.

With continued reference to FIGS. 2-4, the inner opening 62 for each of the first and second ports 32, 34 may be disposed along an upper portion 74 of the container 13. Each inner opening 62 may include a plurality of air guides 76 (FIG. 4) that extend from a conduit 78 of the ports 32, 34 between the inner and outer openings 62, 58 into the interior 40 through the inner opening 62. The plurality of air guides 76 may divide a single air flow path into a plurality of air flow paths through the inner opening 62. The plurality of air guides 76 may generally be aligned with, or parallel to, one another and be operable to guide fluid flow in a direction generally parallel with the plurality of air guides 76. The plurality of air guides 76 may be mounted to the conduit 78 via grating 80 that extends from one side 82 of the conduit 78 to another side 84 of the conduit 78 and couples with each of the plurality of air guides 76 between the sides 82, 84 of the conduit 78. Each of the plurality of air guides 76 may include a protruding portion 85 that extends from the inner opening 62 formed by the inner wall 54 to an end that may engage the object 73 in the interior 40 to distribute the force of the object 73 engaging the sidewall 42, as previously described with respect to the textured surface 70. In this way, the protruding portion 85 may extend beyond the inner opening 62 into the interior 40. Accordingly, the protruding portions 85 may be operable as a continuation of the textured surface 70.

With continued reference to FIG. 4, the protruding portion 85 may define a clearance region 86, or clearance space, between the end of the protruding portion 85 and the inner opening 62. The clearance region 86 may serve as part of a fluid flow path into the interior 40 and allow the fluid to flow over and/or around the object 73 that engages the textured surface 70. Thus, in the example illustrated in FIG. 4, the fluid flow may be deflected downward, upward, or laterally around the instruction. For example, the protruding portion 85 may guide the fluid flow through the clearance region 86 when an obstruction (e.g., contents 73) covers the inner opening 62.

Still referring to FIG. 4, and as will be described further in reference to the proceeding figures, the first and second ports 32, 34 may extend at an oblique angle relative to the sidewall 42 of the container 13. Thus, the first and second ports 32, 34 may extend in a generally parallel direction with the plurality of air guides 76 corresponding to the particular port. In this way, the airflow paths between the interior 40 and the climate control system 18 may be guided throughout the conduit 78 of the ports 32, 34.

Figure 5:
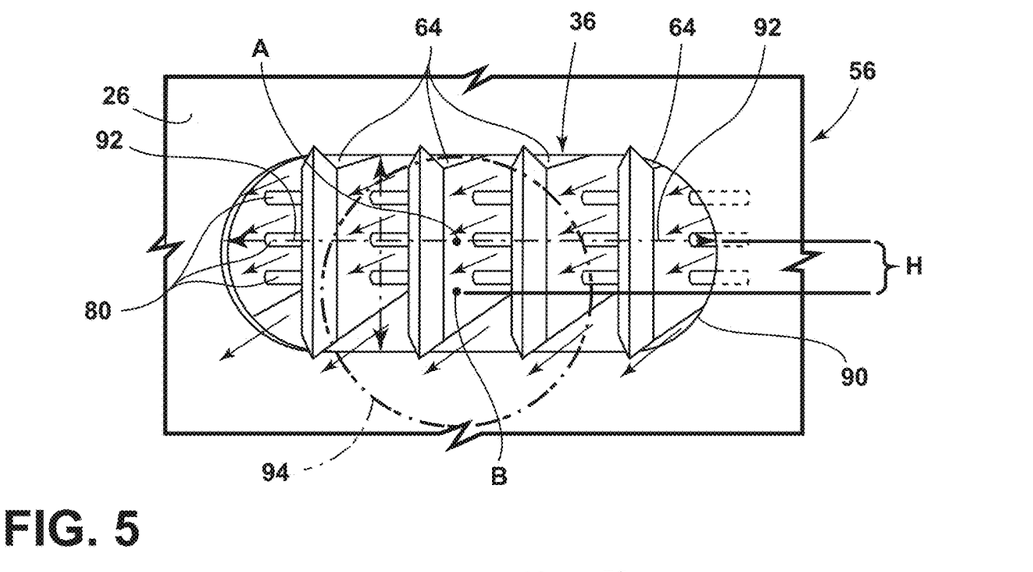
FIG. 5 is a front view of a passage on a wall of a compartment of the vehicle of FIG. 2 with exemplary flow paths being guided by air guide features.

Referring now to FIG. 5, one of the passages 36, 38 is shown in detail, such as the first passage 36, incorporating the guide feature 64 described with respect to the ports 32, 34. As previously described, the passages 36, 38 may include a plurality of vanes 64 that are configured to guide fluid flow between climate control system 18 and the ports 32, 34 at an oblique angle relative to the wall 26, 28. For example, the plurality of vanes 64 may include first vanes on the first passage 36 and second vanes on the second passage 38. The first vanes may direct air channels from the second vanes and vice versa. Similar to the grating 80 coupling the plurality of air guides 76 with the conduits 78, grating 80 may also be disposed in the passages 36, 38 for coupling the plurality of vanes 64 with a peripheral wall of the passages 36, 38.

As shown in FIG. 5, the shape of the fluid connection 10 at the connection interface 56 (e.g., at an entry/exit of the ports 32, 34 and/or the passages 36, 38), may have an elongated cross-sectional area 90, such as an oval, an ellipse, a rectangle, or the like. The elongated shape 90 may have a long axis 92 and a short axis 94, with the long axis 92 extending in a lateral direction and the short axis 94 extending in the vertical direction. As compared to a circularly-shaped cross-section 96 (depicted in phantom), a center of the connection interface A may be disposed higher, or further from the floor 30, than a center B of the circularly-shaped cross-section. For example, the elongated cross-section may provide for a height difference H from a central axis of a circular cross-section 96 to that of the elongated cross-section 90, with each example having similar or the same flow rates. Stated differently, the exemplary elongated cross-sectional shape of the fluid connection 10 may have less fluid flow across a vertical distribution of the connection interface 56 relative to the circular cross-section, but may have a significantly longer long axis 92 and therefore an increased horizontal distribution. Thus, similar flow densities may be achieved while providing a greater height from the floor 30. The increased height may allow for enhanced heat and/or air distribution within the container 13 by providing the fluid flow along the upper portion 74 of the container 13 and therefore limiting regions in the container 13 from lower quality heat and/or air distribution. In this way, the present connection interface 56 may allow for enhanced heating or cooling distribution within the container 13 and/or the compartment 14 (e.g., if the container 13 is removed).

Figure 6:
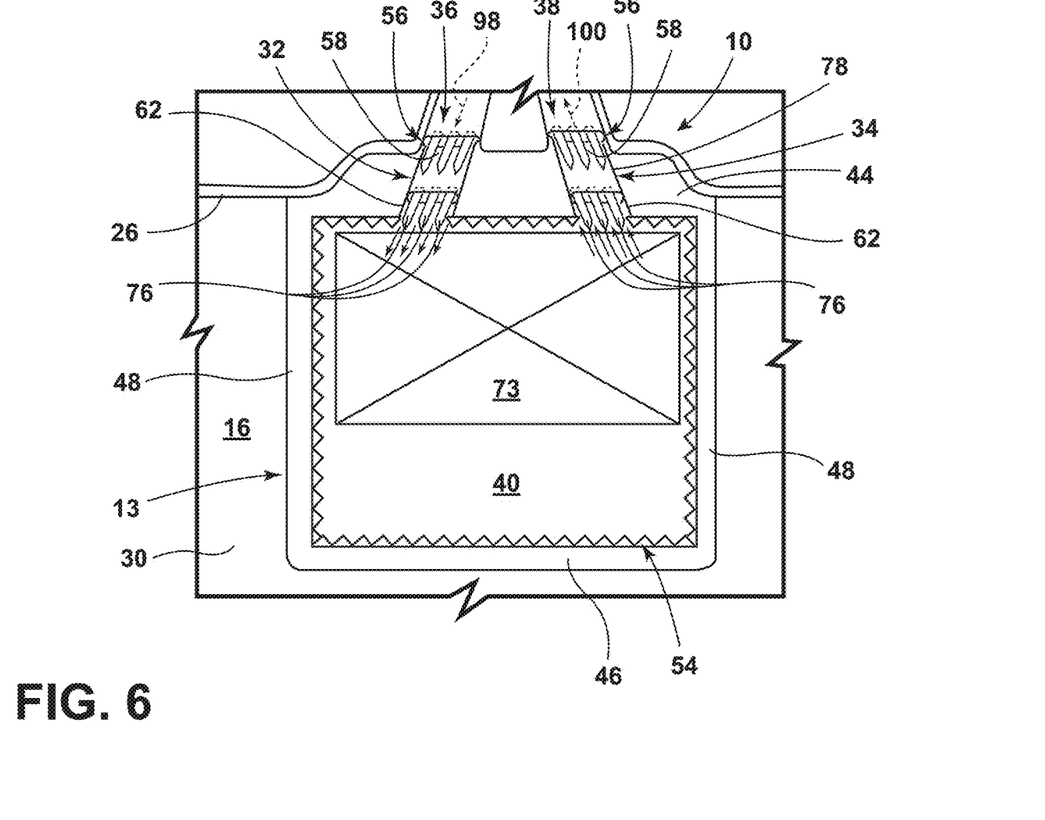
FIG. 6 is a lateral cross-sectional view of a fluid connection between a container and a compartment of a vehicle when the container is connected with the compartment.

Referring now more particularly to FIG. 6, an exemplary first fluid path and an exemplary second fluid path are illustrated in the form of an ingress fluid path 98 and egress fluid path 100 with respect to the interior 40. In this example, the first port 32 is inserted in the first passage 36 and the second port 34 is inserted in the second passage 38, though other connections that provide for the first and second fluid paths 98, 100 may be employed. In operation, hot or cold air is provided to the interior 40 through the first passage 36 and the first port 32, and return air is provided through the second passage 38 and the second port 34 back to the climate control system 18. As air is provided through the first passage 36 and first ports 32 along the first flow path 98, the air passes through the vanes 64 of the first passage 36 that are configured to guide the first flow path 98 away from the second flow path 100. Upon entering the first port 32, the air travels through the conduit 78 and is (again) guided by the plurality of air guides 76 to release at an oblique angle relative to the inner wall 54 of the container 13 into the interior 40.

In general, the oblique angle of release is directed away from the second flow path through the connection interface 56, such as being directed toward the proximate lateral wall 48 of the container 13 as illustrated. For example, a first portion of the fluid flow may extend in a first direction, and a second portion of the fluid flow may extend in a second direction different than the first direction. As air circulates within the container 13 it proceeds to the egress fluid path 100 and is drawn through the air guides 76 along the second flow path and through the conduit 78 of the second port 34. Upon exiting the second port 34, the air flows along the second flow path through the vanes 64 of the second passage 38 at an oblique angle relative to the sidewall 42 and in a direction away from the interior 40.

The angle of fluid distribution through the interior 40 may provide for a greater circulation within the container 13 and limit backflow heated or cooled air from entering and immediately exiting the container 13. Thus, by angling the inner openings 62, the outer openings 58, and/or the ports 32, 34, an enhanced venting scheme may be implemented for the climate control system 18 to operate efficiently.

It is contemplated that one or more of the angled portals, vents, grating 80, or the like, may be omitted, and only a single or multiple angled ingresses/egresses may be provided to achieve the enhanced distribution. In some examples, the passages 36, 38 are generally parallel with one another, the outer openings 58 are generally parallel with one another, and only the inner openings 62 are nonparallel with one another and the fluid flow is distributed evenly through the container 13. In other examples (e.g., FIG. 6), the flow paths 98, 100 are angled away from one another at both the ports 32, 34 and the passages 36, 38.

In general, the fluid connection 10 of the present disclosure may incorporate the vanes 64 and/or the air guides 76 with regular or irregular shapes to limit a flat surface of a bag, a box, or other contents 73 of the container 13 (e.g., food items, food enclosures, etc.) from restricting airflow into or out of the container 13 or the compartment 14. Further, the textured surface 70 of the container 13 or insulated bag/box 13 may be shaped similarly to or differently from the air guides 76 and/or the vanes 64. For example, the air guides 76 may have a waffled shape to aid in air circulation. In addition, the elongated shapes 90 of the intakes and outlets of one or both of the ports 32, 34 and the passages 36, 38 may provide for increased airflow and reduced likelihood of objects 73 (e.g., contents 73 of the container 13, contents 73 of the compartment 14) from falling into or being inserted in the holes unintentionally. For example, this may be achieved by providing the intakes/outlets toward the upper portion 74 of the container 13 and/or an upper part of the wall 26, 28 the compartment 14.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A fluid connection for a vehicle, comprising:
    a container selectively coupled with a compartment of the vehicle and including at least one passage in fluid communication with an interior of the container;
    at least one port disposed on the compartment in fluid communication with a climate control system in the vehicle, wherein the at least one passage is in fluid communication with the at least one port when the container is coupled with the compartment, and wherein the at least one port has an elongated cross-sectional area at a connection interface between the at least one port and the at least one passage; and
    a first flow path and a second flow path each between the climate control system and the interior, wherein the at least one passage includes a first passage having a first vane configured to guide the first flow path away from the second flow path, wherein the at least one passage includes a second passage having a second vane configured to guide the second flow path away from the first flow path.

2. The fluid connection of claim 1, wherein the elongated cross-sectional area is elongated in a lateral direction generally parallel with a floor of the compartment.

3. The fluid connection of claim 1, wherein the at least one first port is disposed along an upper portion of the container.

4. The fluid connection of claim 1, wherein the at least one port includes a first port and a second port aligned with the first and second passages, respectively, and wherein the first flow path extends between the first passage and the first port and the second flow path extends between the second passage and the second port.

5. The fluid connection of claim 1, wherein the at least one port extends between an outer opening at the connection interface and an inner opening at the interior, wherein the inner opening is configured to guide fluid flow between the container and the at least one passage at an oblique angle relative to an inner wall of the container.

6. The fluid connection of claim 5, further comprising:
    an air guide disposed in the inner opening extending at an oblique angle relative to the inner wall and dividing the fluid flow into a plurality of fluid paths.

7. The fluid connection of claim 6, wherein the air guide includes a protruding portion extending from the opening into the interior.

8. The fluid connection of claim 7, wherein the air guide defines a clearance space between an end of the protruding portion and the opening.

9. The fluid connection of claim 8, wherein the clearance space is configured to provide fluid communication between the at least one port and the interior around an obstruction in the interior when the obstruction engages the air guide.

10. The fluid connection of claim 5, wherein the inner wall includes a textured surface facing the interior to limit obstruction of the inner opening.

11. A fluid connection of a climate control system for a vehicle, comprising:
    a container selectively coupled with a compartment of the vehicle and including a first port and a second port each extending through a sidewall of the container;
    a first passage and a second passage disposed on the compartment each in fluid communication with the climate control system, wherein the first and second passage includes a plurality of vanes at a connection interface configured to guide the fluid flow at an oblique angle relative to the connection interface;

an air guide disposed in at least one of the first and second ports and configured to guide fluid flow at an oblique angle relative to the sidewall of the container, wherein the first and second ports are in fluid communication with the first and second ports at a connection interface when the container is coupled with the compartment, wherein the ports and the passages each have an elongated cross-sectional area at the connection interface.

12. The fluid connection of claim 11, wherein each of the ports includes an opening facing the interior, and wherein the air guide includes a protruding portion that extends beyond the opening into the interior.

13. The fluid connection of claim 12, wherein the protruding portion defines a clearance region between the opening and an end of the protruding portion, wherein the protruding portion is configured to guide the fluid flow through the clearance region when an obstruction covers the opening.

14. The fluid connection of claim 11, wherein a first portion of the fluid flow at the first port extends in a first direction, and wherein a second portion of the fluid flow at the second port extends in a second direction different than the first direction.

15. A fluid connection for a vehicle, comprising:
a container selectively coupled with a compartment of the vehicle and including a port extending through a sidewall of the container;
a passage disposed on the compartment and in fluid communication with a climate control system in the vehicle, wherein the passage includes a plurality of vanes at a connection interface configured to guide the fluid flow at an oblique angle relative to the connection interface; and
an air guide disposed in the port and configured to guide the fluid flow at the oblique angle relative to the sidewall of the container, wherein the air guide includes a protruding portion extending into the interior and defining a clearance space between an end of the protruding portion and the sidewall, wherein the port and the passage each have an elongated cross-sectional area at the connection interface between the port and the passage.

* * * * *